United States Patent
Rao

(10) Patent No.: US 6,648,931 B1
(45) Date of Patent: Nov. 18, 2003

(54) CONFIGURATION AND PROCESS FOR GASIFICATION OF CARBONACEOUS MATERIALS

(75) Inventor: Ashok Rao, Rancho Santa Margarita, CA (US)

(73) Assignee: Fluor Corporation, Aliso Viejo, CA (US)

( * ) Notice: Subject to any disclaimer, the term of this patent is extended or adjusted under 35 U.S.C. 154(b) by 406 days.

(21) Appl. No.: 09/634,270

(22) Filed: Aug. 8, 2000

Related U.S. Application Data

(60) Provisional application No. 60/191,204, filed on Mar. 22, 2000, and provisional application No. 60/126,515, filed on Mar. 26, 1999.

(51) Int. Cl.⁷ .............................. C10J 3/20; C10K 3/00
(52) U.S. Cl. .............................. 48/62 R; 48/63; 48/75; 48/77; 48/89; 48/107; 48/119; 60/39.12; 422/188; 422/189; 422/198; 422/199
(58) Field of Search ................. 48/63, 71, 75, 48/76, 200, 203, 62 R, 77, 89, 107, 119; 66/39.12; 422/188, 198, 199, 189

(56) References Cited

U.S. PATENT DOCUMENTS

| | | | | |
|---|---|---|---|---|
| 4,150,953 A | * | 4/1979 | Woodmansee | 48/71 |
| 4,976,549 A | * | 12/1990 | Khan | 374/56 |
| 5,398,663 A | * | 3/1995 | Kulasinghe | 123/549 |

* cited by examiner

Primary Examiner—Jerry D. Johnson
Assistant Examiner—Alexa Ann Doroshenk

(57) ABSTRACT

A turbine produces in an improved gasification process a stream of pressurized air, which is cooled and further compressed by a cooler and booster/compressor. The cooled and compressed air is humidified in a humidifier, heated by a low temperature heat source and subsequently fed into a gasification vessel in which a feedstock is gasified or partially oxidized. The humidifier may advantageously utilize wastewater to humidify the cooled and compressed air, wherein the wastewater may or may not be produced by a component in a gasification plant.

20 Claims, 1 Drawing Sheet

CONFIGURATION AND PROCESS FOR GASIFICATION OF CARBONACEOUS MATERIALS

This application claims the benefit of U.S. provisional application number 60/191,204 filed Mar. 22, 2000, and claims the benefit of U.S. Provisional 60/126,515 filed Mar. 26, 1999, incorporated herein by reference in its entirety.

FIELD OF THE INVENTION

The field of the invention is an improved configuration and process for gasification of carbonaceous materials.

BACKGROUND OF THE INVENTION

Many processes for the production of power, hydrocarbons, and ammonia employ a gasification or partial oxidation unit. While some of the gasification or partial oxidation units are oxygen blown (e.g., by rerouting a stream of purified oxygen from an air separation unit to the gasifier), other gasification or partial oxidation units are air blown. In addition to the stream of air that delivers oxygen for the oxidation of the feedstock in air-blown gasifiers, steam is frequently introduced into the gasification or partial oxidation unit to control the process temperature, and in some cases, to provide a source of hydrogen.

Steam for an air-blown gasification or partial oxidation unit is typically generated in a steam generator driven by a high-temperature heat source. Since the steam demand in most gasification or partial oxidation units is considerable, production of steam employing high-temperature heat sources often leads to a significant decrease in thermal efficiency of the power or gas generation plant. Moreover, many steam generators require de-mineralized water to prevent calcification and build-up of other non-volatile components.

To increase the thermal efficiency of power and/or gas generation plants, various approaches have been developed. For example, in one approach described in U.S. Pat. No. 3,818,869 to Blaskowski, a portion of the low-Btu gas from a gasification unit is employed to fire a steam generator, and heat from the gasifier is further delivered to the steam generator feed water. Although the use of the low-Btu gas as an energy source for steam generation improves the thermal efficiency at least to some extent in this particular configuration, the generation of steam nevertheless requires significant amounts of thermal energy.

In another approach, Johnson et al. teach in U.S. Pat. No 5,695,532 the use of particulate solid carbonaceous fuel with high moisture content, in which the water contained in the feedstock evaporates within the gasification unit to produce the steam required in the gasification process. Johnson's system advantageously eliminates or at least greatly reduces the need to generate and introduce steam into the gasification unit. However, in order to maintain efficient gasification, the moisture content of the feedstock needs to be adjusted to a level suitable for gasification, thereby requiring additional process steps and drying facilities. Moreover, Johnson's process is generally limited to solid carbonaceous feedstock.

Although various modifications to gasification plant configuration and processes to improve thermal efficiency have been developed, all or almost all of them suffer from one or more disadvantages. Therefore, there is a need for an improved configuration and process for gasification of carbonaceous material.

SUMMARY OF THE INVENTION

The present invention is directed to an improved configuration and process for gasification of carbonaceous materials, in which humidified air is introduced into a gasification/partial oxidation vessel. The humidified air is generated via a turbine that produces a stream of pressurized air, which is subsequently cooled by a cooler. A booster further compresses the cooled pressurized air, and a humidifier humidifies the stream of cooled compressed air. A low temperature heat source provides heat for the humidifier, and the humidified air is preheated before introduction into the gasification vessel. It is generally preferred that the turbine comprises a gas turbine and the booster compresses the pressurized air to a pressure of 300 to 400 psi or less.

In one aspect of the inventive subject matter, the gasification vessel is part of an integrated gasification combined cycle facility (IGCC). The gasification vessel may be utilized to gasify a feedstock in a fixed-bed process, a fluidized-bed process, or an entrained-flow process, and may alternatively be employed in a partial oxidation process. While preferred feedstock of the gasification process comprises oil, coke, coal, liquid and/or solid hydrocarbon containing material, the feedstock for partial oxidation preferably comprises hydrocarbons.

In another aspect of the inventive subject matter, the humidifier utilizes wastewater to humidify the cooled compressed air, and it is preferred that the humidifier employs a counter current flow of water, wherein the wastewater is preferably produced by a component of the gasification plant. Especially contemplated humidifiers include a water circulation loop that includes a water heater operationally coupled to the water circulation loop wherein the water heater advantageously comprises a heat exchanger or a low-Btu gas cooler.

Various objects, features, aspects and advantages of the present invention will become more apparent from the following detailed description of preferred embodiments of the invention, along with the accompanying drawing.

DETAILED DESCRIPTION

Figure 1:
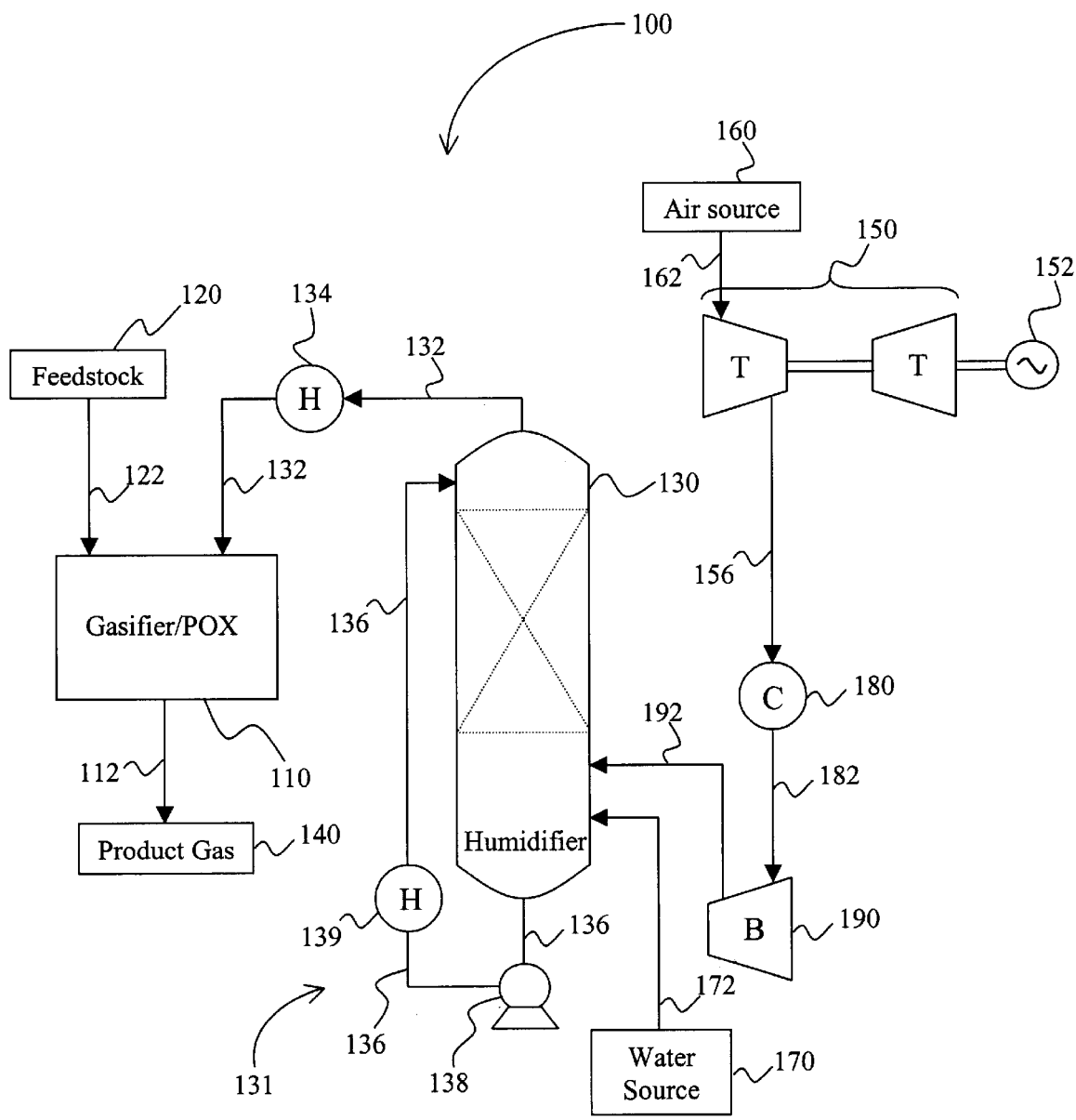
FIG. 1 is a schematic view of an improved gasification according to the inventive subject matter.

In FIG. 1, an improved configuration for a gasification system 100 generally comprises a gasification vessel 110 that receives feedstock 120 via a feedstock line 122, and a stream of humidified heated air via humid air line 132. The product gas 140 from the gasification process leaves the gasification vessel 110 via product gas line 112. A turbine 150 is operationally coupled to a generator 152. Air is supplied to the turbine 150 from an air source 160 via air feed line 162, and a stream of pressurized air leaves the turbine 150 through pressurized air line 156. A cooler 180 cools the pressurized air, and the cooled pressurized air is transferred to a booster/compressor 190 through cooled air feed line 182. The booster/compressor 190 compresses the cooled pressurized air, thereby producing a stream of cooled compressed air that is fed into the humidifier 130 via feed line 192. The humidifier 130 has a water recycling loop 131 that includes a water recycling pump 138 pumping water from the humidifier 130 through a water recycling heater 139 back into the humidifier via water recycling line 136. The water for the humidifier 130 is provided from a water source 170 through water feed line 172. A stream of humidified compressed air leaves the humidifier via humid air line 132 and is further heated by heater 134. The stream of humidified heated air is fed into the gasification vessel 110 via humid air line 132.

It is generally preferred that the plant is an integrated gasification combined cycle facility, however, alternative configurations are also contemplated, including gasification and/or partial oxidation plants in which the gas turbine is not coupled to steam turbine. For example, appropriate plants may include plants predominantly configured to generate syngas from carbonaceous feedstock, or configured to predominantly produce purified air, so long as alternative plants include a gasification/partial oxidation vessel. Consequently, the means for pressurizing air and the air source may vary greatly.

With respect to the means for pressurizing air it is generally preferred that a single compressor coupled to a turbine, preferably a single gas turbine, pressurizes the stream of air. A particularly preferred turbine is a gas turbine configured to produce a stream of pressurized air at approximately 350 lb/s at a pressure of about 200 to 600 psi. For example, in a typical IGCC facility it is contemplated that the gas turbine is a General Electric F or H series turbine. In alternative aspects, various means for pressurizing air other than a gas turbine are also contemplated, and the choice of appropriate means for pressurizing air will predominantly depend on the particular configuration of the gasification/partial oxidation plant and may include a turbine, a compressor, or a source of pre-compressed air. For example, one or more steam turbines coupled to a compressor may be utilized to pressurize a stream of air in a plant configuration operating without a gas turbine. Alternatively, the stream of pressurized air may be provided by a single or multi-stage compressor powered by electricity, gas, or other power source.

With respect to the air source, it is contemplated that the source of air need not be limited to a particular source but may vary considerably. While it is generally preferred that the air is filtered ambient air, it is also contemplated that alternative air sources may include purified and partially purified gases from other processes within the gasification plant. Further alternative air sources may include comprise oxygen enriched or oxygen depleted gases, combustible and non-combustible gases and/or gas mixtures from offgases produced within the plant.

In further aspects of the inventive subject matter, the cooler comprises a heat exchanger that is sized and dimensioned to cool the stream of pressurized air from a temperature of about 600° F. to 1000° F. to a temperature of approximately 60° F. to 140° F. While the thermal coupling of the heat exchanger is not limited to a particular heat sink, it is preferred that the heat exchange be conducted in two stages with the high temperature heat transferred to the humid air and/or the humidifier circulation water and the lower temperature heat thermally coupled to a cooling tower. Alternatively, various coolers other than a heat exchanger may be utilized and appropriate coolers include air and/or water-cooling systems. In still further alternative aspects of the inventive subject matter, carbon dioxide or other refrigerant (e.g., halogenated hydrocarbons) based cooling systems may be employed.

The stream of cooled, pressurized air is preferably further compressed by a booster to a pressure level of approximately 400 psi to 1300 psi, and a particularly preferred booster is a centrifugal compressor-type booster. However, there are many other boosters known in the art, all of which are contemplated for use herein so long as the booster is sized and dimensioned to compress the stream of cooled pressurized air from a pressure level of about 200 psi to approximately 1300 psi.

The humidifier is preferably a single packed column-type humidifier with a diameter of about 10 ft–15 ft and a height of approximately 50 ft in which the stream of cooled compressed air is humidified to at least 75% saturation in a counter current contact of water with respect to the stream of cooled compressed air. It is further preferred that the humidifier has a water circulation loop to recycle the water that has not been absorbed in the cooled compressed air, and it is especially preferred that the water circulation loop includes a low temperature heat source as a water heater. With respect to pressure levels within the humidifier, it is contemplated that operating pressures are generally between 400 psi and 1300 psi, however higher levels of up to 1500 psi and more, or lower levels of approximately 200 psi and less are also contemplated. Likewise, while the preferred temperature within the humidifier is typically in the range of 300° F. to 400° F., higher temperatures of up to 600° F. and higher are also appropriate. Alternatively, where suitable, the temperatures in the humidifier may also be lower, about 250° F.

In alternative aspects of the inventive subject matter, the humidifier need not be limited to a single packed column-type humidifier, and alternative humidifiers may include humidifiers with non-counter current flow of water, and a spray-type humidifier. Furthermore, it should be appreciated that more than one humidifier may be employed, particularly where relatively high amounts of humidified air is required or where it is advantageous to humidify air in subsequent stages. Where multiple humidifiers are utilized, the humidifiers may be operated in series or in parallel. In cases where the humidifier has a water circulation loop, it is preferred that water circulation loop includes a low temperature heat source as a water heater, and appropriate low temperature heat sources include a heat exchanger, and heat sources that utilize natural energy sources such as solar energy and geothermal energy. It should further be recognized that, while a water circulation loop for recycling humidification fluid is preferred, humidifiers without a water circulation loop are also contemplated. For example, where the water source is a relatively large water reservoir, appropriate humidifiers may only have a fill- and maintenance line. Alternatively, unused water leaving the humidifier may be rerouted to other elements in the plant (e.g., to a cooler or steam generator).

With respect to the water source, it should be recognized that many water sources are suitable, and particularly contemplated water sources include wastewater, which may or may not be produced by a component of the gasification plant. Alternatively, further contemplated water sources include fresh water, seawater, reclaimed water, and purified water. For example, where the gasification plant is located in close proximity to a natural source of water (e.g., a lake, or river), fresh water or seawater may be employed to humidify the cooled compressed air. On the other hand, where the quality of available water demands a work-up prior to introduction into the humidifier, partial or total purification is contemplated and may include filtration, deionization, reverse osmosis, etc.

While the humidified compressed air is preferably heated in a heat exchange unit that is thermally coupled to the gasification vessel, various alternative configurations and heaters also contemplated, including thermal coupling of heat exchange units to components other than the gasification vessel, electric heating elements, fluid-based heaters, etc. For example, a heat exchange unit may be thermally coupled to the exhaust system of a gas turbine, especially where the gas turbine is not coupled to a steam turbine. Alternatively, where heat exchange with other components is not readily available, electrically powered heating units may be utilized. It is generally contemplated that the heater increases the temperature of the humidified air in the range of about 400° F. to 1000° F.

The gasification vessel is preferably a fixed-bed process gasification unit with a production capacity of between about 400 lb/s to 800 lb/s product gas derived from coal (feedstock). In alternative aspects of the inventive subject matter, the gasification vessel need not be restricted to a fixed-bed process gasification unit, but may also include other types of gasification vessels such as fluidized-bed gasification units, and entrained-flow gasification units, and in still further alternative aspects, the gasification vessel may also be employed in a partial oxidation. Consequently, depending on the particular type of gasification/partial oxidation, the feedstock may vary. It is generally contemplated that the feedstock is a carbonaceous feedstock, and it is particularly preferred that the carbonaceous feedstock comprises oil, coke, coal, liquid hydrocarbon containing material, and solid hydrocarbon containing material. Where the gasification vessel is utilized to partially oxidize a substrate it is contemplated that the substrate comprises a hydrocarbon, and it is especially preferred that the substrate is natural gas, or heavy oil.

It should be especially appreciated that while in contemplated gasification plants humidified air is introduced into the gasification vessel in place of steam, in alternative configurations both steam and humidified air may be introduced. For example, where the gasification process requires temperature regulation or an oxygen concentration that can not be sufficiently satisfied by the stream of heated humidified air, it is contemplated that steam may be introduced in addition to the stream of heated humidified air in various amounts. Where additional steam is introduced into the gasification vessel, it is generally preferred that about 5–25% of the added water is added as steam, however, various proportions other than 5–25% are also contemplated, including 25–50% steam, 50–75% steam, and 75–100% steam. It should further be appreciated that the additional steam may be introduced continuously but it is also contemplated that the additional steam may be intermittently added.

Thus, specific embodiments and applications of an improved configuration and process for gasification of carbonaceous material have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant, comprising:
    a turbine that produces a stream of pressurized air, and a cooler coupled to the turbine such that the cooler receives and cools the stream of pressurized air to produce a stream of cooled pressurized air;
    a booster fluidly coupled to the turbine such that the booster receives and further compresses the stream of cooled pressurized air to produce a stream of cooled compressed air;
    a humidifier fluidly coupled to the booster, wherein the humidifier receives and humidifies the stream of cooled compressed air to produce a stream of humidified compressed air, and a heater operationally coupled to the humidifier such that the heater receives and heats the stream of humidified compressed air to produce a stream of heated humidified air; and
    a gasification vessel fluidly coupled to the humidifier such that the gasification vessel receives at least part of the stream of heated humidified air.

2. The plant of claim 1 wherein the plant is an integrated gasification combined cycle facility.

3. The plant of claim 1 wherein the turbine comprises a gas turbine.

4. The plant of claim 1 wherein the cooler comprises a heat exchanger.

5. The plant of claim 1 wherein the cooler comprises a water cooler.

6. The plant of claim 1 wherein the booster compresses the stream of cooled pressurized air to a pressure of at least 400 psi.

7. The plant of claim 1 wherein the humidifier has a water circulation loop that includes a water heater operationally coupled to the water circulation loop.

8. The plant of claim 7 wherein the water heater comprises a heat exchanger.

9. The plant of claim 1 wherein the humidifier utilizes wastewater to humidify the stream of cooled compressed air.

10. The plant of claim 9 wherein the wastewater is produced by a component of a gasification plant.

11. The plant of claim 1 wherein the humidifier employs a counter current contact of water with respect to the stream of cooled compressed air to produce the stream of humidified compressed air.

12. The plant of claim 1 wherein the heater comprises a heat exchanger.

13. The plant of claim 1 wherein the heater comprises an electrical heater.

14. The plant of claim 1 wherein the gasification vessel is utilized to gasify a feedstock.

15. The plant of claim 14 wherein the gasification employs a fixed-bed process.

16. The plant of claim 14 wherein the gasification employs a fluidized-bed process.

17. The plant of claim 14 wherein the gasification employs an entrained-flow process.

18. The plant of claim 14 wherein the feedstock is selected from the group consisting of oil, coke, coal, liquid hydrocarbon containing material, and solid hydrocarbon containing material.

19. The plant of claim 1 wherein the gasification vessel is utilized to partially oxidize a substrate.

20. The plant of claim 19 wherein the substrate comprises a hydrocarbon.

* * * * *